(12) United States Patent
Maberry

(10) Patent No.: US 7,147,069 B2
(45) Date of Patent: Dec. 12, 2006

(54) WIND TURBINE DRIVEN GENERATOR SYSTEM FOR A MOTOR VEHICLE

(76) Inventor: Robert L. Maberry, 3037 Acoma Dr., Indianapolis, IN (US) 46235

( * ) Notice: Subject to any disclaimer, the term of this patent is extended or adjusted under 35 U.S.C. 154(b) by 499 days.

(21) Appl. No.: 10/141,155

(22) Filed: May 8, 2002

(65) Prior Publication Data

US 2003/0209370 A1    Nov. 13, 2003

(51) Int. Cl.
*B60K 16/00* (2006.01)
(52) U.S. Cl. .................. 180/2.2; 180/65.3; 180/165
(58) Field of Classification Search ............. 180/2.1, 180/2.2, 65.2, 65.3, 65.1, 68.1, 68.2, 68.3, 180/165, 302
See application file for complete search history.

(56) References Cited

U.S. PATENT DOCUMENTS

| | | | |
|---|---|---|---|
| 2,036,485 A * | 4/1936 | Lintern et al. ............... 454/138 |
| 3,367,438 A | 2/1968 | Moore .......................... 180/65 |
| 3,444,946 A * | 5/1969 | Waterbury ................... 180/2.2 |
| 3,513,326 A | 5/1970 | Potts ............................ 290/55 |
| 3,556,239 A * | 1/1971 | Spahn ........................ 180/65.2 |
| 3,621,930 A * | 11/1971 | Dutchak ..................... 180/65.3 |
| 3,713,503 A * | 1/1973 | Haan ............................ 180/2.2 |
| 3,876,925 A | 4/1975 | Stoeckert ........................ 322/1 |
| 3,878,913 A * | 4/1975 | Lionts et al. ................. 180/2.2 |
| 3,971,454 A * | 7/1976 | Waterbury .................. 180/65.8 |
| 4,134,469 A * | 1/1979 | Davis .......................... 180/2.2 |
| 4,179,007 A | 12/1979 | Howe ........................... 180/65 |
| 4,254,843 A * | 3/1981 | Han et al. .................... 180/165 |
| 4,314,160 A * | 2/1982 | Boodman et al. ............. 290/55 |
| 4,423,368 A * | 12/1983 | Bussiere ...................... 322/35 |
| 4,660,879 A * | 4/1987 | Kobayashi et al. ....... 296/180.5 |
| 5,287,004 A * | 2/1994 | Finley .......................... 290/55 |
| 5,296,746 A * | 3/1994 | Burkhardt .................... 290/55 |
| 5,746,283 A * | 5/1998 | Brighton .................... 180/65.3 |
| 6,138,781 A * | 10/2000 | Hakala ......................... 180/2.2 |
| 6,313,394 B1 * | 11/2001 | Shugar et al. ............. 136/244 |
| 6,412,585 B1 * | 7/2002 | DeAnda ..................... 180/291 |
| 6,423,894 B1 * | 7/2002 | Patz et al. ................... 136/244 |

* cited by examiner

*Primary Examiner*—Christopher P. Ellis
*Assistant Examiner*—Bridget Avery
(74) *Attorney, Agent, or Firm*—Ronald K. Aust; Taylor & Aust, P.C.

(57) ABSTRACT

The invention relates to a vehicle including a body having a one or more openings. The body is configured, such as through the use of air guides, to receive an airflow through the one or more openings. An electrical generator assembly is mounted inside the vehicle and in fluid communication with a respective opening to receive the airflow, and wherein a separate electric generator assembly is associated with each of the openings. Each electrical generator assembly includes a housing, an electric generator mounted to the housing and a turbine assembly coupled to the electric generator.

20 Claims, 5 Drawing Sheets

WIND TURBINE DRIVEN GENERATOR SYSTEM FOR A MOTOR VEHICLE

BACKGROUND OF THE INVENTION

1. Field of the Invention

The present invention relates to a vehicle, and, more particularly, to a wind turbine driven generator system for a vehicle, such as an automobile.

2. Description of the Related Art

It is known to provide a wind turbine driven generator on a moving vehicle in order to supply electric power for purposes such as recharging a battery or running accessories. Such turbine generator units have been mounted on the roof of the passenger compartment as well as on top of the front hood of the vehicle.

A problem is that the housing that contains the turbine on the roof of the vehicle greatly adds to the vehicle's wind resistance. The power source that propels the vehicle must produce more power in order to overcome the wind resistance, thereby reducing the efficiency of the vehicle. Turbine generator units mounted on top of the front hood of the vehicle have the additional disadvantage of obstructing the view of the driver of the vehicle, thereby causing a safety hazard. Turbine generator units mounted on the roof or front hood of the vehicle have the further disadvantage of being aesthetically unappealing.

What is needed in the art is a vehicle including a wind turbine driven generator that does not add to the wind resistance of the vehicle and that does not detract from the vehicle's aesthetic appeal.

SUMMARY OF THE INVENTION

The present invention provides a vehicle including one or more wind turbine driven generator assemblies that do not add to the wind resistance of the vehicle and that do not detract from the vehicle's aesthetic appeal.

In one form, the invention relates to a vehicle including a body having a first opening. The body is configured to receive an airflow through the first opening. A first electrical generator assembly is mounted inside the vehicle and in fluid communication with the first opening to receive the airflow. The first electrical generator assembly includes a housing, an electric generator mounted to the housing and a turbine assembly coupled to the electric generator. In one embodiment of the invention, the housing has a sealing surface configured to be disposed inside the vehicle adjacent the body.

In another form thereof, the invention relates to a vehicle, wherein the body includes a plurality of openings, each the plurality of openings being in fluid communication with a separate respective electric generator assembly mounted inside the body.

An advantage of the present invention is that it does not add to the wind resistance of the vehicle.

Another advantage is that it does not detract from the aesthetic appeal of the vehicle.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
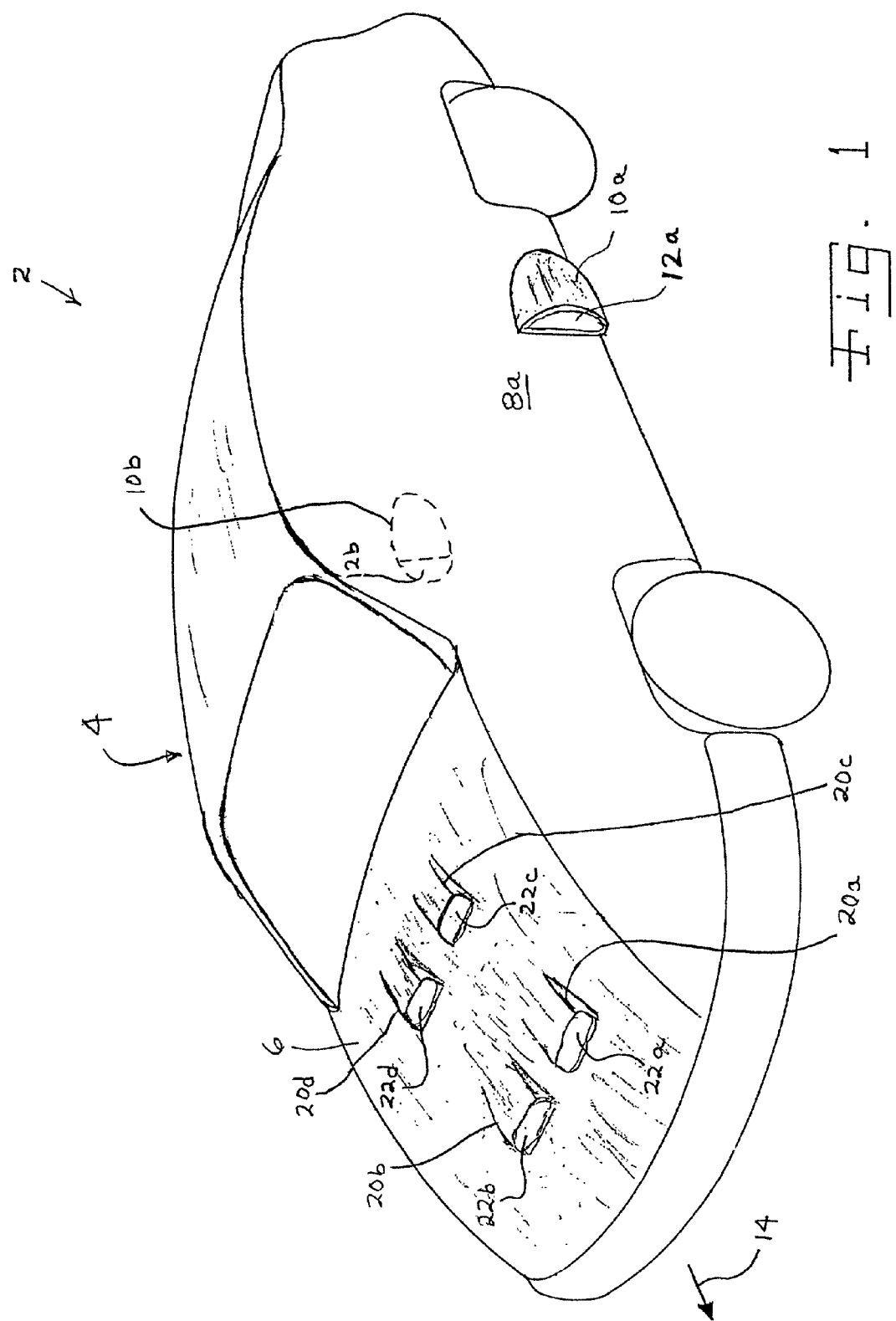
FIG. 1 is a perspective view of a vehicle embodying the present invention.
Figure 2:
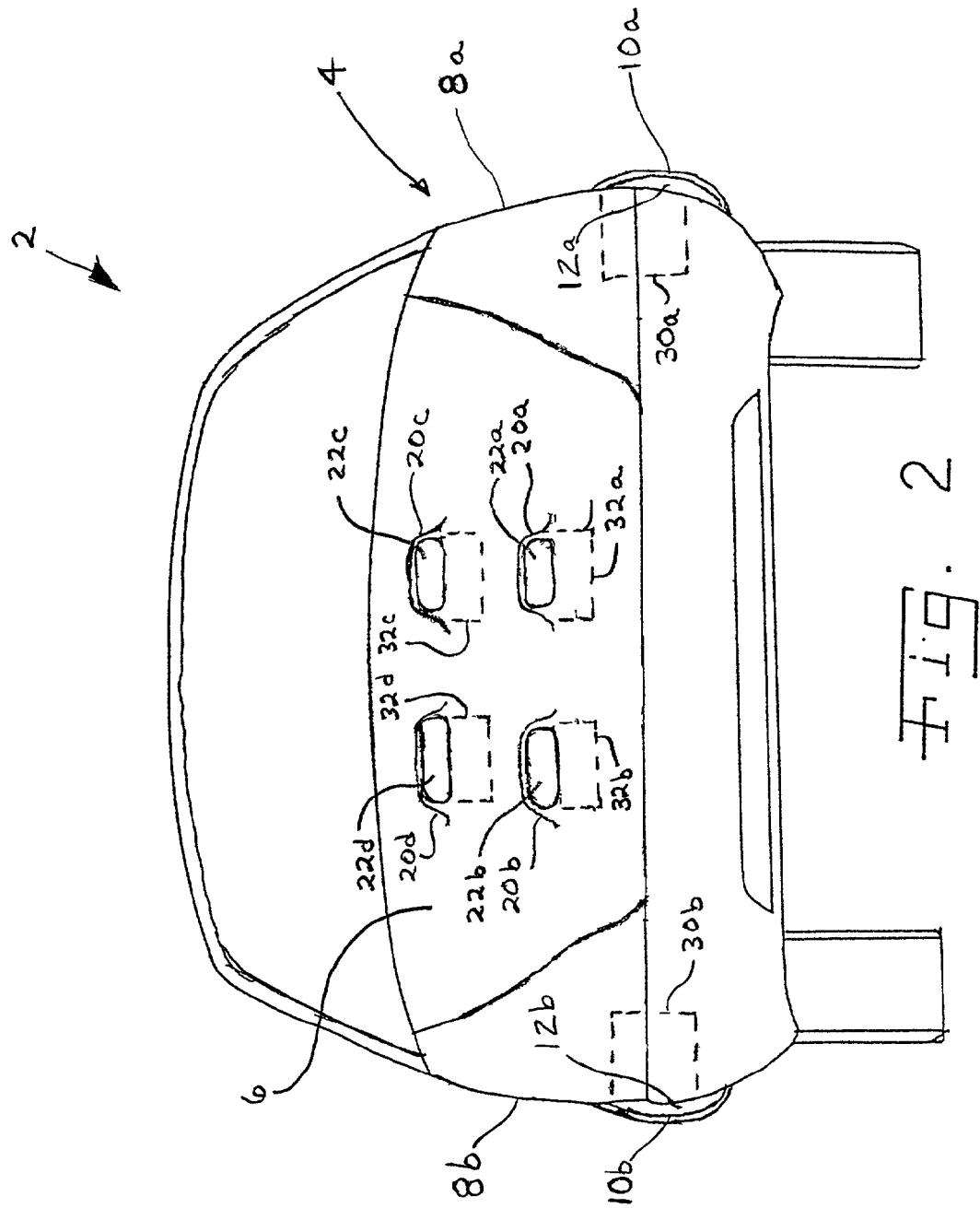
FIG. 2 is a front view of the vehicle of FIG. 1.

Referring now to the drawings and particularly to FIG. 1, there is a vehicle 2 embodying the present invention. Vehicle 2 includes a body 4. As shown in FIGS. 1 and 2, body 4 includes a front hood 6, a side panel 8a and a side panel 8b.

Side panel 8a includes an air guide 10a defining an opening 12a. Side panel 8b includes an air guide 10b defining an opening 12b. Air guides 10a and 10b are oriented to receive an airflow when vehicle 2 is traveling in the direction indicated generally by direction arrow 14. Airflows received in openings 12a and 12b are directed through corresponding openings in side panels 8a and 8b, respectively. It is contemplated that air guide 10a may be formed as an integral portion of side panel 8a, or may be fixedly attached to side panel 8a. Likewise, it is contemplated that air guide 10b may be formed as an integral portion of side panel 8b, or may be fixedly attached to side panel 8b.

Front hood 6 includes air guides 20a, 20b, 20c and 20d. Air guides 20a, 20b, 20c and 20d define openings 22a, 22b, 22c and 22d, respectively. Air guides 20a, 20b, 20c and 20d also are oriented to receive via openings 22a, 22b, 22c and 22d airflows when vehicle 2 is traveling in direction 14. Airflows received in openings 22a, 22b, 22c and 22d are directed through corresponding openings in front hood 6, respectively. It is contemplated that air guides 20a, 20b, 20c and 20d may be formed as an integral portion of front hood 6, or may be fixedly attached to front hood 6.

Disposed within vehicle 2 are electrical generator assemblies 30a, 30b, 32a, 32b, 32c and 32d. Generator assemblies 30a and 30b are located to receive air flows directed through openings 12a and 12b, respectively. As shown in FIG. 2, generator assemblies 30a and 30b are mounted inside vehicle 2, and more particularly, inside side panels 8a and 8b, respectively, and positioned adjacent air guides 10a and 10b, respectively. Electrical generator assemblies 32a, 32b, 32c and 32d are located to receive air flows directed through openings 22a, 22b, 22c and 22d, respectively. As shown in FIG. 2, electrical generator assemblies 32a, 32b, 32c and 32d are mounted inside vehicle 2 under front hood 6 and positioned adjacent to air guides 20a, 20b, 20c and 20d, respectively.

Figure 3:
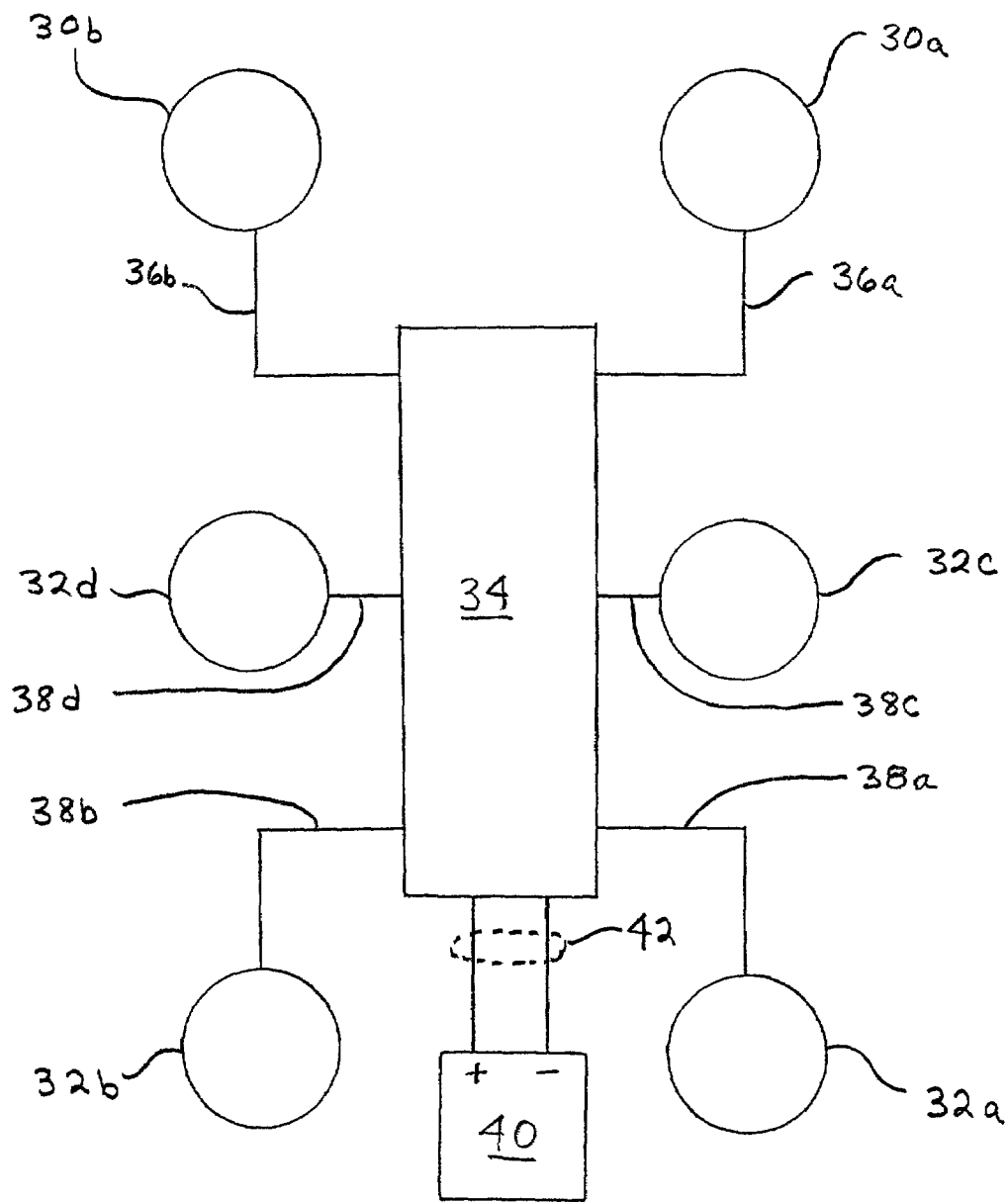
FIG. 3 is a schematic diagram of one embodiment of a wind driven turbine generating system of the vehicle of FIG. 1.

Referring now to FIG. 3, each of electrical generator assemblies 30a, 30b, 32a, 32b, 32c and 32d is electrically connected to an electrical regulator 34 (FIG. 3) via electrical conductors 36a, 36b, 38a, 38b, 38c and 38d, respectively.

An output of electrical regulator 34 is electrically connected to a battery 40 via electrical conductor 42.

Each of electrical generator assemblies 30a, 30b, 32a, 32b, 32c and 32d supplies generated electrical energy to electrical regulator 34 via electrical conductors 36a, 36b, 38a, 38b, 38c and 38d, respectively. Electrical regulator 34 serves as a voltage and/or current regulator for supplying electrical energy to battery 40 at the appropriate voltage and/or current level via electrical conductor 42. Each of electrical conductors 36a, 36b, 38a, 38b, 38c, 38d and 42 are, for example, multi-conductor cables. Battery 40 may be a single unit, or alternatively, may include multiple batteries connected in series and/or parallel.

Structurally and electrically, each of electrical generator assemblies 30a, 30b, 32a, 32b, 32c and 32d are substantially identical. Accordingly, for the sake of convenience, only one of the electrical generator assemblies, referenced below generally as electrical generator assembly 32, will be described in detail with reference to FIGS. 4 and 5. However, those skilled in the art will recognize that the discussion that follows pertaining to electrical generator assembly 32 will apply equally to each of electrical generator assemblies 30a, 30b, 32a, 32b, 32c and 32d.

Electrical generator assembly 32 includes a housing 50, an electric generator 52 and a turbine assembly 54. Electrical generator 52 is mounted to housing 50. Housing 50 is mounted via a mounting bracket 56 to a frame member 58 of vehicle 12. Turbine assembly 54 is attached to a rotatable shaft 60 of electric generator 52.

Figure 5:
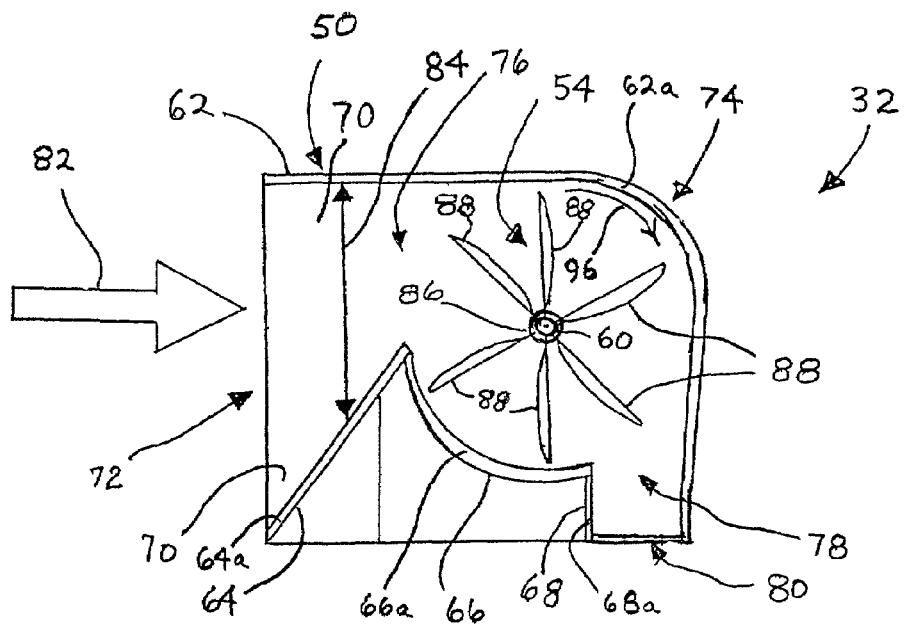
FIG. 5 is a top view of the electrical generating assembly of FIG. 4.

Referring to FIG. 5, housing 50 is defined by walls 62, 64, 66, 68 and 70. Wall 70 serves as a base to which walls 62, 64, 66, 68 are attached. Each of walls 62, 64, 66 and 68 include a sealing surface 62a, 64a, 66a and 68a, respectively, that is shaped to conform to a shape of, and thus be adjacent to, an inside surface of a body panel of body 4, such as front hood 6 or side panels 8a, 8b, depending, of course, upon the location within vehicle 2 that electrical generator assembly 32 is mounted. Thus, in the embodiment shown, a body panel, such as front hood 6 or side panels 8a, 8b, engages sealing surfaces 62a, 64a, 66a and 68a to form a cover for completing the enclosure for housing 50. A seal material 71, such as foam rubber, may be positioned between sealing surfaces 62a, 64a, 66a and 68a and the respective front hood 6 or side panels 8a, 8b of body 4. Since vehicle 2 may be designed for front hood 6 to be opened while electrical generator assemblies 32a, 32b, 32c, 32d remain stationary, it is preferred that the sealing material at these locations be attached to one of front hood 6, or alternatively to sealing surfaces 62a, 64a, 66a and 68a. Where seal material 71 is used, the referenced engagement of sealing surfaces 62a, 64a, 66a and 68a with body 4 is indirect, and sealing surfaces 62a, 64a, 66a, 68a are still considered adjacent to an inside surface of body 4.

In part, walls 62, 64, 70 define an air inlet channel 72. In part, walls 62, 66 and 70 define a turbine housing portion 74. Turbine housing portion 74 includes a turbine inlet 76 and a turbine outlet 78. In part, walls 62, 68 and 70 define an air exhaust port 80.

Figure 4:
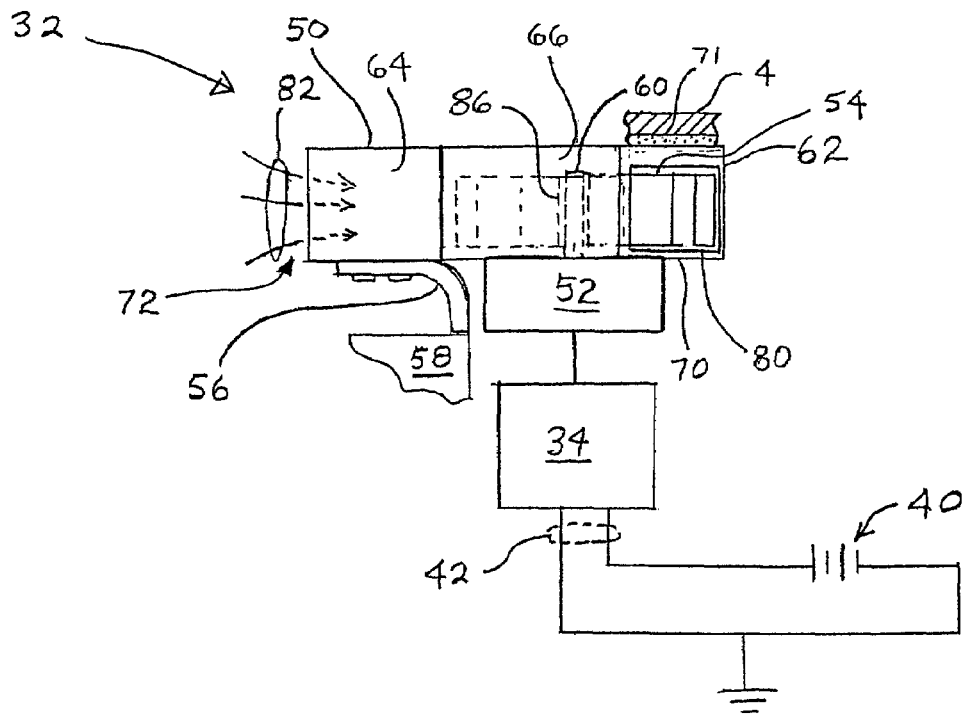
FIG. 4 is a side view of one embodiment of one of the electrical generator assemblies of FIG. 3.

When electrical generator assembly 32 is installed in vehicle 2, air inlet channel 72 is located to be connected in fluid communication with a respective one of openings 12a, 12b, 22a, 22b, 22c, 22d. As shown in FIGS. 4 and 5, air inlet channel 72 directs an airflow 82 to turbine inlet 76 of turbine housing portion 74. Air inlet channel 72 has a width 84 measured between walls 62 and 64 that diminishes in the direction of airflow 82.

Turbine assembly 54 is positioned within turbine housing portion 74. Turbine assembly 54 includes a hub 86 and a plurality of vanes 88. Turbine assembly 54 is shown in FIG. 5 as having six vanes 88. However, it is to be understood that turbine assembly 54 can have more or less than six vanes, depending upon the specific rotation characteristics desired. Each of the plurality of vanes 88 is fixedly attached to hub 86, and extends radially from hub 86. Vanes 88 are evenly spaced along a circumference of hub 86. In the embodiment having six vanes, one of vanes 88 will be adjacent to turbine inlet 76 at each 60 degrees of rotation of turbine assembly 54. Hub 86 includes a cylindrical opening sized for receiving shaft 60 of electric generator 52 in a snug fit. Shaft 60 and hub 86 may be fixedly joined using a key and set screw arrangement, which is well known in the art. Shaft 60 is oriented perpendicular to the direction of airflow 82.

Figure 6:
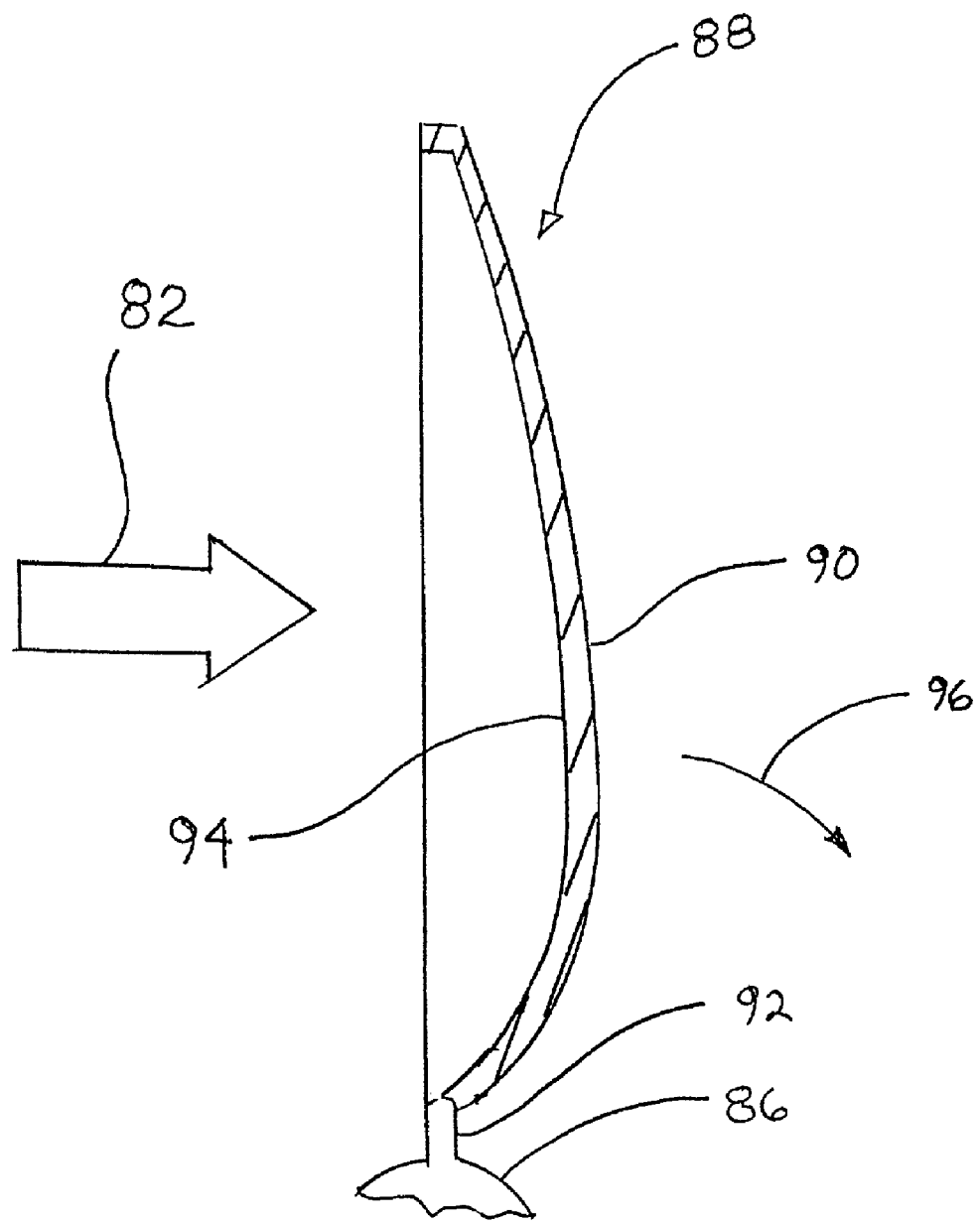
FIG. 6 is a side sectional view of one of the vanes of the electrical generating assembly of FIG. 5.

Referring to FIG. 6, each vane of the plurality vanes 88 has a concave portion 90 and a stem 92 interconnecting concave portion 90 to hub 86. Each concave portion 90 has a concave surface 94 facing the direction of airflow 82. The concave surface 94 of vanes 88 increases the surface area that receives airflow 82 and thereby increases the torque exerted by turbine assembly 54 on shaft 60 of electric generator 52 over that of a flat vane.

During use, as vehicle 2 moves in direction 14 (FIG. 1), air is received by openings 12a, 12b, 22a, 22b, 22c, 22d of air guides 10a, 10b, 20a, 20b, 20c, 20d, respectively, which in turn creates airflow 82 that is directed to a respective air inlet channel 72 (FIG. 5) of housing 50 of a respective electrical generator assembly 30a, 30b, 32a, 32b, 32c, 32d. Air inlet channel 72 then directs airflow 82 through turbine inlet 76 of turbine housing portion 74. Airflow 82 increases in velocity as air inlet channel 72 narrows. Airflow 82 then engages the concave surfaces 94 (FIG. 6) of a portion of the plurality of vanes 88 to exert a force on the portion of the plurality of vanes 88 to cause a rotation of turbine assembly 54, and in turn, shaft 60 of electric generator 52, in rotary direction 96. The rotation of shaft 60 causes the electric generator 52 of each of respective electrical generator assemblies 30a, 30b, 32a, 32b, 32c, 32d to generate electrical current which is supplied via electrical conductors 36a, 36b, 38a, 38b, 38c, 38d to electrical regulator 34 (FIG. 3). Electric regulator 34, in turn, recharges battery 40. Electrical regulator 34 limits the amount of current and/or voltage that charges battery 40 in the event that the electrical power output of one or more of electrical generator assemblies 30a, 30b, 32a, 32b, 32c, 32d is too high.

Airflow 82 exits housing 50 via air exhaust port 80 and, preferably, is reused for other purposes. For example, the exhaust air can be directed to an internal combustion engine to be used as combustion air in either of a vehicle powered by a conventional internal combustion engine, or powered by a hybrid internal combustion engine/electrical motor. As a further example, the exhaust air can be directed to vehicle components to be used as cooling air to cool components, such as, for example, an internal combustion engine, electrical motor, brakes, or various electrical and electronic components.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A vehicle, comprising:
a body including a body panel having a first opening, said body panel being configured to receive an airflow through said first opening; and
a first electrical generator assembly mounted inside said vehicle and in fluid communication with said first opening of said body panel to receive said airflow, said first electrical generator assembly including:
a housing engaged with said body panel, said housing including a plurality of walls defining a sealing surface to engage said body panel such that said body panel forms a cover of said housing, said plurality of walls further defining an air inlet channel positioned in fluid communication with said first opening of said body panel;
an electric generator mounted to said housing; and
a turbine assembly located inside said housing in fluid communication with said first opening of said body panel via said air inlet channel of said housing, said turbine assembly being coupled to said electric generator.

2. The vehicle of claim 1, further comprising a seal material positioned between said body panel and said sealing surface of said housing.

3. The vehicle of claim 1, wherein said first opening is formed in a front hood of said vehicle.

4. The vehicle of claim 1, wherein said first opening is formed in a front hood of said vehicle, further comprising a seal material positioned between said front hood and said sealing surface of said housing, such that engagement of said sealing surface of said housing with said front hood is indirect, said seal material being attached to only one of said front hood and said sealing surface of said housing.

5. The vehicle of claim 1, wherein said first opening is formed in a side panel of said vehicle.

6. The vehicle of claim 1, wherein said first opening has associated therewith an air guide formed integral with said body panel.

7. The vehicle of claim 1, wherein said housing includes a turbine housing portion, said turbine assembly being located in said turbine housing portion, said air inlet channel being configured to increase a velocity of said airflow before said airflow reaches said turbine housing portion.

8. The vehicle of claim 1, wherein said housing includes means for providing said airflow as combustion air for said vehicle.

9. The vehicle of claim 1, wherein said body panel includes a plurality of openings, each of said plurality of openings being in fluid communication with a separate respective electrical generator assembly mounted inside said body.

10. The vehicle of claim 1, wherein said turbine assembly comprises a hub, and a plurality vanes extending radially from said hub, each of said plurality of vanes including a concave surface facing said airflow.

11. The vehicle of claim 5, further comprising a seal material positioned between said side panel and said sealing surface of said housing.

12. The vehicle of claim 9, wherein a first portion of said plurality of openings is formed in a front hood of said body and a second portion of said plurality of openings is formed in side panels of said body.

13. The vehicle of claim 9, wherein each of said plurality of openings has associated therewith a separate air guide.

14. The vehicle of claim 9, wherein each said separate respective electrical generator assembly is electrically connected to an electrical regulator, said electrical regulator being electrically connected to a battery.

15. The vehicle of claim 10, wherein each of said plurality of vanes includes a stem interconnecting said concave portion surface to said hub.

16. The vehicle of claim 13, wherein each said air guide is formed integral with said body.

17. A vehicle, comprising:
a body panel having a first opening, said body panel being configured to receive an airflow through said first opening; and
a housing containing a turbine assembly that is coupled to an electrical generator, said housing including a plurality of walls defining a sealing surface and defining an air inlet channel, said sealing surface of said housing being positioned to engage said body panel such that said body panel forms a cover for completing an enclosure of said housing, said air inlet channel being positioned in fluid communication with said first opening for receiving said air flow passing through said first opening of said body panel.

18. The vehicle of claim 17, further comprising a seal material positioned between said body panel and said sealing surface of said housing, said body panel being one of a front hood and a side panel.

19. A vehicle including a turbine assembly that is coupled to an electrical generator, comprising:
a body panel having an inside surface;
a housing having a first opening and a second opening, said first opening being an air inlet channel, and said second opening being formed by a plurality of walls defining a sealing surface; and
an enclosure for said turbine assembly formed by said housing engaging said inside surface of said body panel, said sealing surface at said second opening of said housing being engaged with said inside surface of said body panel, said body panel forming a cover for covering said second opening of said housing to complete said enclosure.

20. The vehicle of claim 19, further comprising a seal material positioned between said body panel and said plurality of walls at said sealing surface of said housing.

* * * * *